(12) United States Patent
Tsai et al.

(10) Patent No.: US 10,673,304 B2
(45) Date of Patent: Jun. 2, 2020

(54) SPEED REDUCING DEVICE HAVING POWER SOURCE

(71) Applicant: DELTA ELECTRONICS, INC., Taoyuan (TW)

(72) Inventors: Ching-Hsiung Tsai, Taoyuan (TW); Chi-Wen Chung, Taoyuan (TW); En-Yi Chu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 42 days.

(21) Appl. No.: 16/177,796

(22) Filed: Nov. 1, 2018

(65) Prior Publication Data

US 2019/0140515 A1 May 9, 2019

Related U.S. Application Data

(60) Provisional application No. 62/581,345, filed on Nov. 3, 2017.

(51) Int. Cl.
*F16H 1/32* (2006.01)
*H02K 7/116* (2006.01)
*B60K 17/346* (2006.01)

(52) U.S. Cl.
CPC .......... *H02K 7/116* (2013.01); *B60K 17/3467* (2013.01); *F16H 1/32* (2013.01)

(58) Field of Classification Search
CPC ........ H02K 7/116; B60K 17/3467; F16H 1/32
USPC ...................................................... 475/162
See application file for complete search history.

(56) References Cited

U.S. PATENT DOCUMENTS

| 4,918,344 | A |   | 4/1990 | Chikamori et al. |
|---|---|---|---|---|
| 5,027,023 | A | * | 6/1991 | Koivikko .............. H02K 29/06 310/83 |
| 5,655,985 | A | * | 8/1997 | Herstek ..................... F16H 1/32 475/179 |
| 5,908,372 | A | * | 6/1999 | Janek ....................... F16H 1/32 477/162 |
| 7,105,964 | B2 | * | 9/2006 | Miyazaki ............ F16H 57/0482 310/75 R |

(Continued)

FOREIGN PATENT DOCUMENTS

| CN | 103192693 A | 7/2013 |
|---|---|---|
| EP | 0231392 A1 | 2/1987 |

(Continued)

*Primary Examiner* — Leslie A Nicholson, III
(74) *Attorney, Agent, or Firm* — Kirton McConkie; Evan R. Witt

(57) ABSTRACT

A speed reducing device includes a motor and a speed reducing mechanism. The motor includes a stator portion and a rotor portion. The rotor portion includes a first eccentric ring and a second eccentric ring. The speed reducing mechanism is partially accommodated within the rotor portion. The speed reducing mechanism includes a first roller assembly, a second roller assembly, a third roller assembly, a first cycloid disc set and a second cycloid disc set. The first roller assembly includes at least one first roller. The second roller assembly includes at least one second roller. The third roller assembly includes an output shaft and at least one third roller. The first cycloid disc set is mounted around the output shaft and disposed within the first eccentric ring. The second cycloid disc set is mounted around the output shaft and disposed within the second eccentric ring.

13 Claims, 6 Drawing Sheets

(56) References Cited

U.S. PATENT DOCUMENTS

| | | | | |
|---|---|---|---|---|
| 8,403,789 B2* | 3/2013 | Janek | ...................... | F16H 1/32 |
| | | | | 475/116 |
| 8,863,874 B2 | 10/2014 | Lee | | |
| 9,680,347 B2* | 6/2017 | Sherwin | ................... | H02K 3/47 |
| 10,520,062 B2* | 12/2019 | Tsai | ......................... | F16H 1/32 |
| 2004/0061393 A1 | 4/2004 | Neubauer et al. | | |
| 2012/0176007 A1 | 7/2012 | Takeuchi | | |
| 2016/0053871 A1* | 2/2016 | Fecko | ...................... | F16H 3/70 |
| | | | | 475/168 |

FOREIGN PATENT DOCUMENTS

| | | |
|---|---|---|
| JP | S6228549 A | 2/1987 |
| JP | S6439245 A | 2/1989 |
| JP | 2007051709 A | 3/2007 |
| JP | 2007282377 A | 10/2007 |
| JP | 2013086687 A | 5/2013 |
| JP | 2014152766 A | 8/2014 |

\* cited by examiner ered on an inner surface of the rotor casing assembly. At least a portion of the speed reducing mechanism is located at an inner side of the motor and accommodated within the rotor portion. The speed reducing mechanism includes a first roller assembly, a second roller assembly, a third roller assembly, a first cycloid disc set and a second cycloid disc set. The first roller assembly is located at a first side of the speed reducing mechanism, and includes a first reducer casing and at least one first roller. The at least one first roller is disposed on the first reducer casing. The second roller assembly is located at a second side of the speed reducing mechanism, and includes a second reducer casing and at least one second roller. The at least one second roller is disposed on the second reducer casing. The third roller assembly is disposed between the first roller assembly and the second roller assembly. The third roller assembly is accommodated within the rotor portion, the first roller assembly and the second roller assembly. The third roller assembly includes an output shaft and at least one third roller. The at least one third roller is installed on the output shaft. The first cycloid disc set is mounted around the output shaft and disposed within the first eccentric ring. The first cycloid disc set includes a plurality of first tooth structures and a plurality of second tooth structures. The second cycloid disc set is mounted around the output shaft and disposed within the second eccentric ring. The second cycloid disc set includes a plurality of third tooth structures and a plurality of fourth tooth structures. The at least one first roller is contacted with at least one of the plurality of first tooth structures. The at least one second roller is contacted with at least one of the plurality of third tooth structures. The at least one third roller is contacted with at least one of the second tooth structures and at least one of the fourth tooth structures.

SPEED REDUCING DEVICE HAVING POWER SOURCE

CROSS-REFERENCE TO RELATED APPLICATION

This application claims the benefit of U.S. Provisional Application No. 62/581,345 filed on Nov. 3, 2017, and entitled "POWER GEAR", the entirety of which is hereby incorporated by reference.

FIELD OF THE INVENTION

The present disclosure relates to a speed reducing device, and more particularly to a speed reducing device having a power source.

BACKGROUND OF THE INVENTION

Generally, a motor is operated at a high speed and a low torsion force. In other words, it is difficult to drive a large-sized load. Consequently, for allowing the motor to drive a heavy object, a reducer is used for reducing the rotating speed of the motor and increasing the torsion force.

Conventionally, the reducer and the motor are separate components. It is necessary to connect the reducer with the motor through an additional connection structure such as a shaft coupling or a gear box. In such way, the volume and weight of the overall structure of the reducer and the motor are increased. In other words, the connection structure for connecting the reducer and the motor cannot be applied to the device that requires light weight and compact space. For example, the connection structure is not suitably applied to an industrial robotic arm or a power assisting device.

Nowadays, some reducers are equipped with motors. Under this circumstance, the shaft coupling or the gear box for connecting the reducer and the motor is omitted. However, since this reducer uses a mono-cycloidal set (i.e., a single cycloid), some drawbacks occur. For example, when the reducer is operated at a high speed, it is difficult to maintain the dynamic balance state. Consequently, the operation of the reducer results in high vibration.

Therefore, there is a need of providing a speed reducing device having a power source in order to the address the above issues.

SUMMARY OF THE INVENTION

An object of the present disclosure provides a speed reducing device comprising a motor and a speed reducing mechanism. The motor and the speed reducing mechanism are combined together without the use of a connection structure (e.g., a shaft coupling or a gear box). Since the motor and the speed reducing mechanism are combined as an integral structure, the weight and volume of the speed reducing device are reduced.

Another object of the present disclosure provides a speed reducing device having a power source. The speed reducing device is capable of achieving dynamic balance, high rigidness, and high reduction ratio and driving a high load.

In accordance with an aspect of the present disclosure, there is provided a speed reducing device with a power source. The speed reducing device includes a motor and a speed reducing mechanism. The motor includes a stator portion and a rotor portion. The rotor portion is rotated relative to the stator portion. The rotor portion includes a rotor casing assembly, a first eccentric ring and a second eccentric ring. The first eccentric ring and the second eccentric ring are disposed beside each other and disposed The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
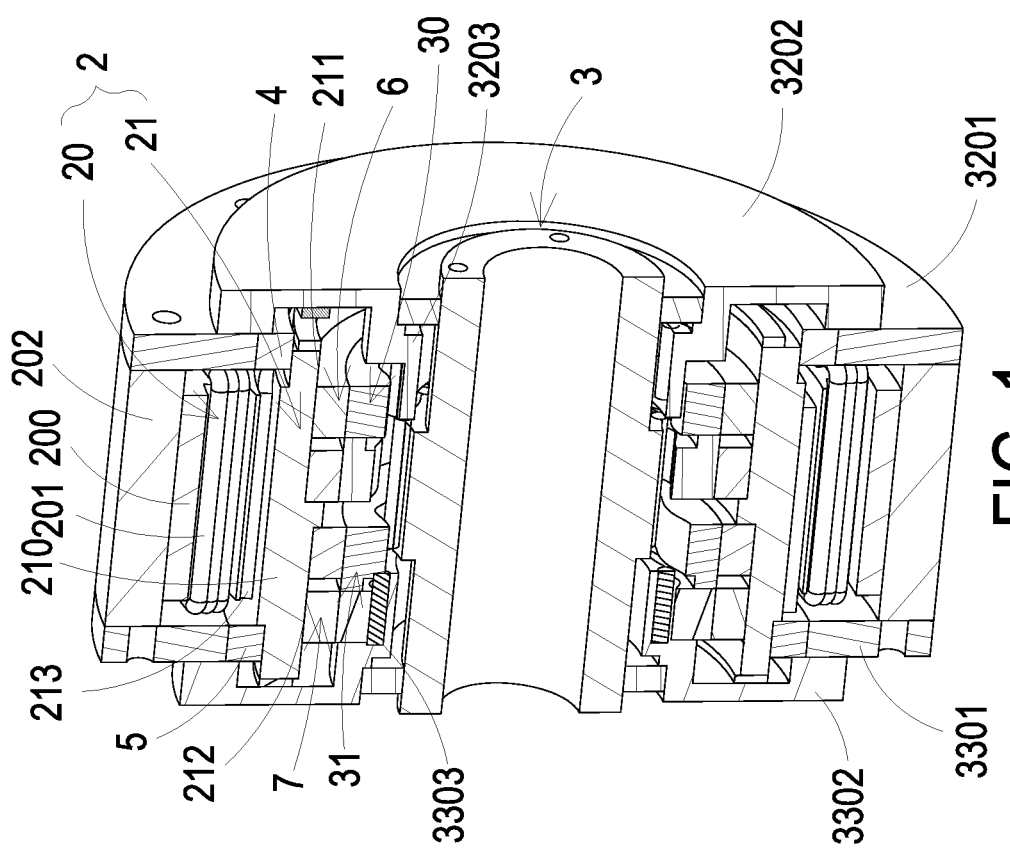
FIG. 1 is a schematic cutaway view illustrating a speed reducing device having a power source according to a first embodiment of the present disclosure.
Figure 2:
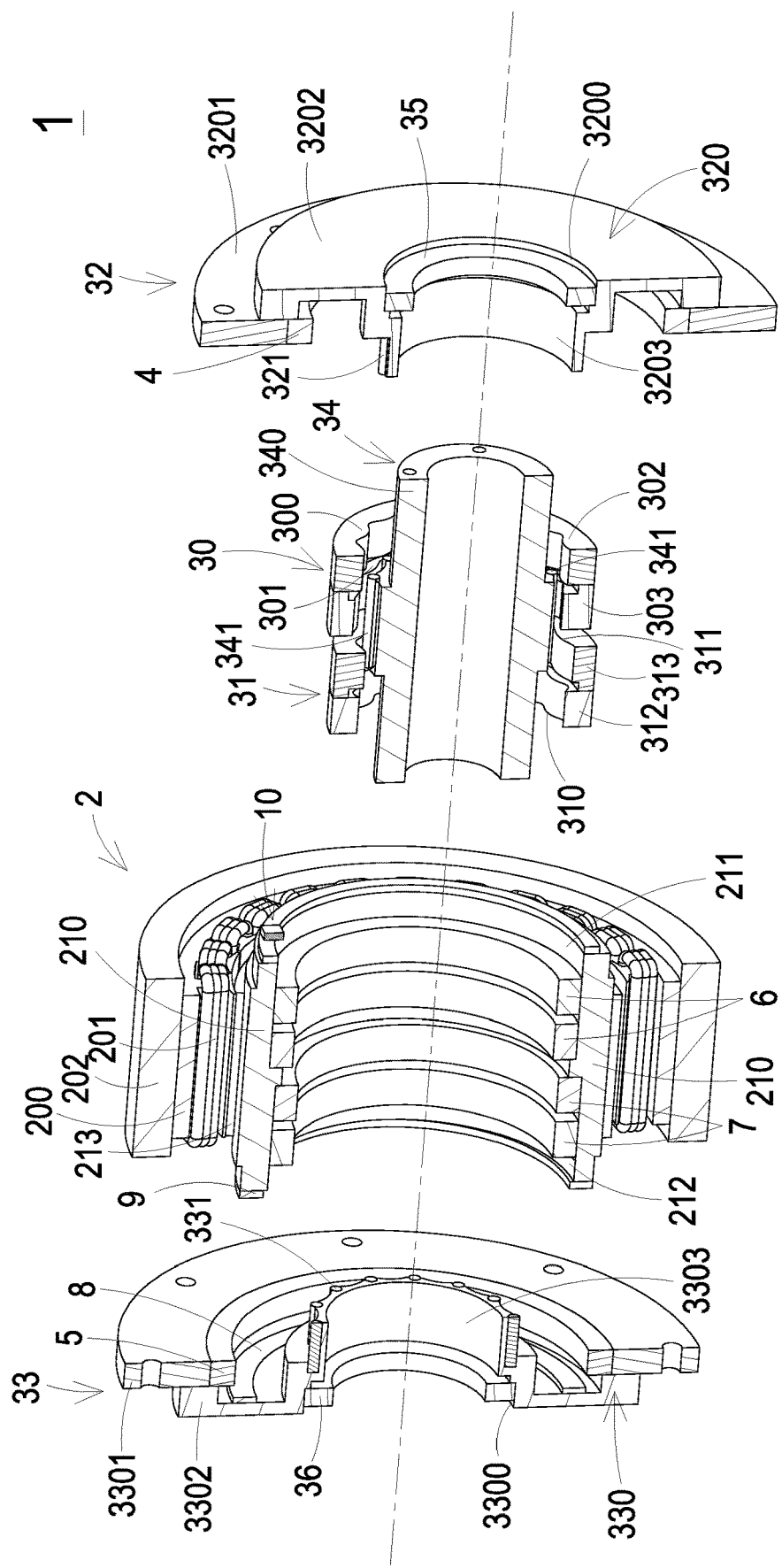
FIG. 2 is a schematic exploded view illustrating the speed reducing device of FIG. 1.
Figure 3:
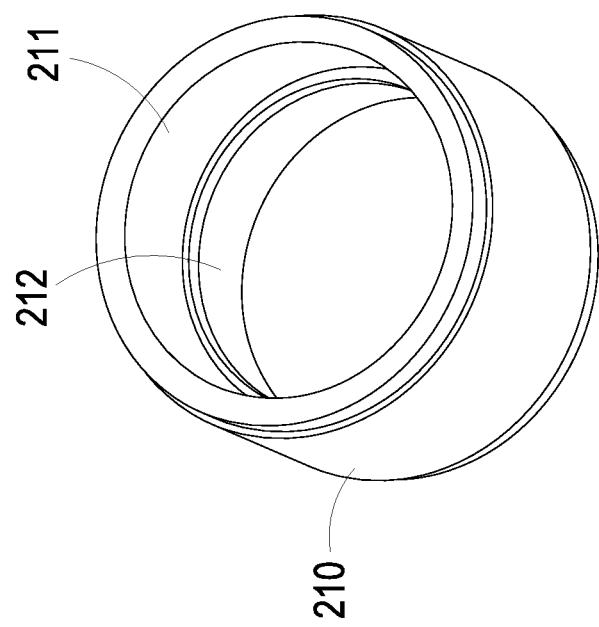
FIG. 3 is a schematic perspective view illustrating a rotor portion of a motor of the speed reducing device of FIG. 1.

Please refer to FIGS. 1, 2 and 3. FIG. 1 is a schematic cutaway view illustrating a speed reducing device having a power source according to a first embodiment of the present disclosure. FIG. 2 is a schematic exploded view illustrating the speed reducing device of FIG. 1. FIG. 3 is a schematic perspective view illustrating a rotor portion of a motor of the speed reducing device of FIG. 1. The speed reducing device having a power source (hereinafter referred to as the speed reducing device 1) can be applied to various power mechanical devices such as industrial robotic arms or power assisting devices in order to provide a speed reducing function.

In this embodiment, the speed reducing device 1 is a two-stage cycloid reducer. The speed reducing device 1 comprises a motor 2 and a speed reducing mechanism 3. The motor 2 is served as a power source.

In an embodiment, the motor 2 is disposed around the speed reducing mechanism 3. For example, the motor 2 is a radial-flux motor. The motor 2 comprises a stator portion 20 and a rotor portion 21. The stator portion 20 is located at the outer side of the overall motor 2. The rotor portion 21 is located at the inner side of the overall motor 2. In this embodiment, the rotor portion 21 comprises a rotor casing assembly 210, a first eccentric ring 211 and a second eccentric ring 212. The rotor casing assembly 210 has a hollow structure for accommodating a portion of the speed reducing mechanism 3. The first eccentric ring 211 and the second eccentric ring 212 are disposed beside each other and disposed on an inner surface of the rotor casing assembly 210. When the rotor portion 21 is rotated relative to the stator portion 20, the first eccentric ring 211 and the second eccentric ring 212 are eccentrically rotated relative to a center of the rotor casing assembly 210. The eccentric direction of the first eccentric ring 211 and the eccentric direction of the second eccentric ring 212 are opposite to each other.

In this embodiment, the stator portion 20 further comprises an iron core assembly 200, a coil assembly 201 and a stator casing assembly 202. The stator casing assembly 202 has a hollow structure. The iron core assembly 200, the coil assembly 201 and the rotor portion 21 are accommodated within the hollow structure of the stator casing assembly 202. The iron core assembly 200 is attached on an inner surface of the stator casing assembly 202. The coil assembly 201 is wound around the iron core assembly 200. The rotor portion 21 further comprises at least one magnet 213. For example, the magnet 213 is an arc-shaped magnet or a ring-shaped magnet. The magnet 213 is attached on an outer surface of the rotor casing assembly 210. The magnet 213 interacts with the coil assembly 201 of the stator portion 20 to generate a magnetic force. In response to the magnetic force, the rotor portion 21 is driven by the magnet 213 and rotated relative to the stator portion 20. In some embodiments as shown in FIGS. 1 and 2, the first eccentric ring 211 and the second eccentric ring 212 are integrally formed with the rotor casing assembly 210, but not limited thereto. In another embodiment, the rotor casing assembly 210, the first eccentric ring 211 and the second eccentric ring 212 are independent components. In addition, the first eccentric ring 211 and the second eccentric ring 212 are fixed on the inner surface of the rotor casing assembly 210 by a screwing means.

In the embodiment as shown in FIGS. 1 and 2, the motor 2 is a radial-flux motor. In another embodiment, the motor 2 is an axial-flux motor. The functions of the axial-flux motor are similar to those of the radial-flux motor and the structure of the axial-flux motor is well known to those skilled in the art. Consequently, the structure of the axial-flux motor is not redundantly described herein.

At least a portion of the speed reducing mechanism 3 is located at the inner side of the motor 2 and accommodated within the rotor portion 21. In an embodiment, the speed reducing mechanism 3 comprises a first cycloid disc set 30, a second cycloid disc set 31, a first roller assembly 32, a second roller assembly 33, an third roller assembly 34, a first reducer bearing 35 and a second reducer bearing 36.

The first roller assembly 32 is located at a first side of the speed reducing mechanism 3. The first roller assembly 32 comprises a first reducer casing 320 and at least one first roller 321. The at least one first roller 321 is disposed on the first reducer casing 320. The first reducer casing 320 is assembled with a first side of the motor 2, and the first side of the motor 2 is covered by the first reducer casing 320. A first axial hole 3200 is formed in a middle region of the first reducer casing 320.

The second roller assembly 33 is located at a second side of the speed reducing mechanism 3, wherein the first side and the second side of the speed reducing mechanism 3 are opposite to each other. The second roller assembly 33 comprises a second reducer casing 330 and at least one second roller 331. The at least one second roller 331 is disposed on the second reducer casing 330. The second reducer casing 330 is assembled with a second side of the motor 2, and the second side of the motor 2 is covered by the second reducer casing 330. That is, the motor 2 is disposed between the first reducer casing 320 and the second reducer casing 330. A second axial hole 3300 is formed in a middle region of the second reducer casing 330.

The third roller assembly 34 is disposed between the first roller assembly 32 and the second roller assembly 33. The third roller assembly 34 is accommodated within the first roller assembly 32, the second roller assembly 33 and the rotor portion 21. The third roller assembly 34 comprises an output shaft 340 and at least one third roller 341. The at least one third roller 341 is mounted on the output shaft 340. A first end of the output shaft 340 is inserted into the first axial hole 3200. A second end of the output shaft 340 is inserted into the second axial hole 3300.

The first cycloid disc set 30 is a sleeve structure that is mounted around the output shaft 340 and disposed within the first eccentric ring 211. Moreover, the first cycloid disc set 30 comprises a plurality of first tooth structures 300 and a plurality of second tooth structures 301.

The second cycloid disc set 31 is a sleeve structure that is mounted around the output shaft 340 and disposed within the second eccentric ring 212. Moreover, the second cycloid disc set 31 comprises a plurality of third tooth structures 310 and a plurality of fourth tooth structures 311.

The at least one first roller 321 is contacted with the at least one corresponding first tooth structure 300. The at least one second roller 331 is contacted with the at least one corresponding third tooth structure 310. The at least one third roller 341 is contacted with the at least one corresponding second tooth structure 301 and the at least one corresponding fourth tooth structure 311.

The first reducer bearing 35 is disposed within the first axial hole 3200 and disposed between the first axial hole 3200 and the output shaft 340.

The second reducer bearing 36 is disposed within the second axial hole 3300 and disposed between the second axial hole 3300 and the output shaft 340.

In case that the first roller assembly 32 comprises a plurality of first rollers 321, the plurality of first rollers 321 are circumferentially and discretely disposed and arranged on the first reducer casing 320. In case that the second roller assembly 33 comprises a plurality of second rollers 331, the plurality of second rollers 331 are circumferentially and discretely disposed and arranged on the second reducer casing 330. In case that the third roller assembly 34 comprises a plurality of third rollers 341, the plurality of third rollers 341 are circumferentially and discretely disposed and arranged on the output shaft 340.

In some embodiments, the first reducer casing 320 of the first roller assembly 32 and the second reducer casing 330 of the second roller assembly 33 have screw holes (not shown). Consequently, the first reducer casing 320 and the second reducer casing 330 are connected with other mechanical structures by employing the screws. Moreover, the first roller assembly 32 and the second roller assembly 33 are not rotated. That is, the first roller assembly 32 and the second roller assembly 33 are not rotated about the output shaft 340. When the rotor portion 21 is rotated relative to the stator portion 20, the first cycloid disc set 30 is rotated with the first eccentric ring 211 and the second cycloid disc set 31 is rotated with the second eccentric ring 212. Since the first roller assembly 32 and the second roller assembly 33 are not rotated, the third rollers 341 contacted with the at least one second tooth structure 301 and the at least one fourth tooth structure 311 are pushed against the at least one second tooth 301 and the at least one fourth tooth 311. Consequently, the third rollers 341 are rotated about the output shaft 340. Since the third rollers 341 are fixed on the output shaft 340, the output shaft 340 is rotated with the third rollers 341. Consequently, the third roller assembly 34 can be rotated about the output shaft 340. Under this circumstance, the output shaft 340 is used as a power output of the speed reducing mechanism 3 for generating and outputting the power. In some other embodiments, the output shaft 340 comprises screw holes (not shown). Consequently, the output shaft 340 is connected with other mechanical structures by employing the screws. In such way, the power can be transmitted to the mechanical structures.

As mentioned above, the motor 2 and the speed reducing mechanism 3 of the speed reducing device 1 are combined as an integral structure. The motor 2 is located at the outer side of the speed reducing device 1 along the radial direction. At least a portion of the speed reducing mechanism 3 is located at the inner side of the speed reducing device 1 along the radial direction. When the rotor portion 21 is rotated relative to the stator portion 20, the first cycloid disc set 30 is rotated with the first eccentric ring 211 and the second cycloid disc set 31 is rotated with the second eccentric ring 212. As mentioned above, the first roller assembly 32 and the second roller assembly 33 are not rotatable, but the third roller assembly 34 is rotatable. Consequently, the first cycloid disc set 30 and the second cycloid disc set 31 interact with the first roller assembly 32, the second roller assembly 33 and the third roller assembly 34. In such way, the purpose of reducing the speed in two stages can be achieved. Since it is not necessary to use an additional shaft coupling to connect the motor 2 and the speed reducing mechanism 3, the volume and weight of the speed reducing device 1 are reduced. Moreover, the first cycloid disc set 30 and the second cycloid disc set 31 are respectively installed on the first eccentric ring 211 and the second eccentric ring 212 that have opposite eccentric directions. Under this circumstance, the first cycloid disc set 30 and the second cycloid disc set 31 are balanced by each other, and the number of rollers to be effectively forced is increased. Consequently, the speed reducing device 1 has high rigidity and dynamic balance and is applicable to a high-load circumstance.

In some embodiments, the output shaft 340 has a hollow inner structure. The cables (e.g., the signal cable of an encoder) or the coil assembly 201 of the stator portion 20 may pass through the hollow inner structure of the output shaft 340. Consequently, the cable layout of the speed reducing device 1 is simplified.

Please refer to FIGS. 1 and 2 again. The first reducer casing 320 comprises a first fixing part 3201 with a hollow structure and a first installation part 3202. A portion of the first fixing part 3201 is assembled with a first lateral edge of the stator casing assembly 202 of the stator portion 20. Moreover, the first fixing part 3201 is contacted with an outer surface of the rotor casing assembly 210. A portion of the first installation part 3202 is fixed on the first fixing part 3201. Moreover, a first ring-shaped extension wall 3203 is protruded from the first installation part 3202 and disposed within the hollow structure of the first fixing part 3201. The first ring-shaped extension wall 3203 has a hollow structure. A portion of the first ring-shaped extension wall 3203 is disposed between the at least one first tooth structure 300 and the output shaft 340. Moreover, the hollow structure of the first ring-shaped extension wall 3203 defines the first axial hole 3200. The at least one first roller 321 is disposed on an outer surface of the first ring-shaped extension wall 3203.

The second reducer casing 330 comprises a second fixing part 3301 with a hollow structure and a second installation part 3302. A portion of the second fixing part 3301 is assembled with a second lateral edge of the stator casing assembly 202 of the stator portion 20. Moreover, the second fixing part 3301 is contacted with the outer surface of the rotor casing assembly 210. A portion of the second installation part 3302 is fixed on the second fixing part 3301. Moreover, a second ring-shaped extension wall 3303 is protruded from the second installation part 3302 and disposed within the hollow structure of the second fixing part 3301. The second ring-shaped extension wall 3303 has a hollow structure. A portion of the second ring-shaped extension wall 3303 is disposed between the at least one third tooth structure 310 and the output shaft 340. Moreover, the hollow structure of the second ring-shaped extension wall 3303 defines the second axial hole 3300. The at least one second roller 331 is disposed on an outer surface of the second ring-shaped extension wall 3303.

The speed reducing device 1 further comprises a first rotor outer bearing set 4 and a second rotor outer bearing set 5. The first rotor outer bearing set 4 is disposed between the first fixing part 3201 and the rotor casing assembly 210. The second rotor outer bearing set 5 is disposed between the second fixing part 3301 and the rotor casing assembly 210. The speed reducing device 1 further comprises a first rotor inner bearing set 6 and a second rotor inner bearing set 7. The first rotor inner bearing set 6 is disposed between the first eccentric ring 211 and the first cycloid disc set 30. The second rotor inner bearing set 7 is disposed between the second eccentric ring 212 and the second cycloid disc set 31. Each of the first rotor inner bearing set 6 and the second rotor inner bearing set 7 comprises at least one bearing. For example, as shown in FIGS. 1 and 2, each of the first rotor inner bearing set 6 and the second rotor inner bearing set 7 comprises a plurality of bearings. In some other embodiments, each of the first rotor inner bearing set 6 and the second rotor inner bearing set 7 comprises a single bearing.

The first cycloid disc set 30 further comprises a first outer cycloid disc 302 and a first inner cycloid disc 303, which have hollow disc structures. The second cycloid disc set 31 further comprises a second outer cycloid disc 312 and a second inner cycloid disc 313, which have hollow disc structures. The first outer cycloid disc 302 and the first inner cycloid disc 303 are disposed side by side. The first inner cycloid disc 303 is disposed between the first outer cycloid disc 302 and the second inner cycloid disc 313. The at least one first tooth structure 300 is protruded from an inner surface of the first outer cycloid disc 302. The at least one second tooth structure 301 is protruded from an inner surface of the first inner cycloid disc 303. The second outer cycloid disc 312 and the second inner cycloid disc 313 are disposed side by side. The second inner cycloid disc 313 is disposed between the first inner cycloid disc 303 and the second outer cycloid disc 312. The at least one third tooth structure 310 is protruded from an inner surface of the second outer cycloid disc 312. The at least one fourth tooth structure 311 is protruded from an inner surface of the second inner cycloid disc 313. The tooth profile of the at least one first tooth structure 300 on the first outer cycloid disc 302 and the tooth profile of the at least one third tooth structure 310 on the second outer cycloid disc 312 are identical. The tooth profile of the at least one second tooth structure 301 on the first inner cycloid disc 303 and the tooth profile of the at least one fourth tooth structure 311 on the second inner cycloid disc 313 are identical. The number of the at least one first tooth structure 300 and the number of the at least one third tooth structure 310 are equal. The number of the at least one second tooth structure 301 and the number of the at least one fourth tooth structure 311 are equal. The number of the at least one first tooth structure 300 and the number of the at least one second tooth structure 301 are different. The number of the at least one third tooth structure 310 and the number of the at least one fourth tooth structure 311 are different. Moreover, the first outer cycloid disc 302 and the first inner cycloid disc 303 are fixedly connected with each other through an assembling process (see FIGS. 1 and 2) or integrally formed with each other. The second outer cycloid disc 312 and the second inner cycloid disc 313 are fixedly connected with each other through an assembling process (see FIGS. 1 and 2) or integrally formed with each other. In some embodiments, the plurality of first rollers 321, the plurality of second rollers 331 and the plurality of third rollers 341 are rotatable on their own axles (i.e., self-rotation).

The number of the at least one first roller 321 of the first roller assembly 32 is equal to the number of the at least one second roller 331 of the second roller assembly 33. The number of the at least one first roller 321 is at least one less than the number of the at least one first tooth structure 300, the number of the at least one second roller 331 is at least one less than the number of the at least one third tooth structure 310, and the number of the at least one third roller 341 of the third roller assembly 34 is at least one less than the number of the at least one second tooth structure 301 or the number of the at least one fourth tooth structure 311.

In some embodiments, the speed reducing device 1 further comprises a first braking element 8 and a second braking element 9. The first braking element 8 is disposed on a lateral surface of the second reducer casing 330 and disposed beside the rotor casing assembly 210. The second braking element 9 is disposed on a lateral surface of the rotor casing assembly 210 and disposed beside the second reducer casing 330. Moreover, the second braking element 9 is aligned with the first braking element 8. The first braking element 8 and the second braking element 9 are selectively separated from each other or contacted with each other. When the first braking element 8 and the second braking element 9 are contacted with each other, the rotation of the rotor portion 21 is limited by the first braking element 8 and the second braking element 9. When the first braking element 8 and the second braking element 9 are separated from each other, the rotation of the rotor portion 21 is allowed.

In an embodiment, the speed reducing device 1 further comprises an encoder 10. The encoder 10 is disposed on a lateral surface of the rotor casing assembly 210 and disposed beside the first reducer casing 320. During the rotation of the rotor portion 21 of the motor 2, the encoder 10 detects the angle or displacement of the rotor portion 21. The encoder 10 comprises a signal source and a signal receiver. The signal source emits a detection signal to the signal receiver. During the rotation of the rotor portion 21 of the motor 2, the cooperation of the signal source and the signal receiver detects the angle or the displacement.

The principles of achieving the desired reduction ratio by using the speed reducing device 1 will be described as follows. For example, the number of the first rollers 321 of the first roller assembly 32 is N, the number of the second rollers 331 of the second roller assembly 33 is N, and the number of the third rollers 341 of the third roller assembly 34 is M. The number of the at least one first tooth structure 300 is A, the number of the at least one third tooth structure 310 is A, the number of the at least one second tooth structure 301 is B, and the number of the at least one fourth tooth structure 311 is B. While the rotor portion 21 of the motor 2 is rotated, the first eccentric ring 211 and the second eccentric ring 212 installed on the rotor portion 21 are synchronously rotated with the rotor portion 21. As the first eccentric ring 211 and the second eccentric ring 212 are rotated, the at least one first roller 321 of the first roller assembly 32 contacted with the at least one first tooth structure 300 is not rotatable about the output shaft 340, and the at least one second roller 331 of the second roller assembly 33 contacted with the at least one third tooth structure 310 is not rotatable about the output shaft 340. Since the operations of the first cycloid disc set 30 and the second cycloid disc set 31 are restricted by the above conditions, the rotating speed of the first cycloid disc set 30 (and the second cycloid disc set 31) is $(A-N)/A$ times the rotating speed of the motor 2. That is, a first-stage speed reduction is achieved. Moreover, since the at least one third roller 341 of the third roller assembly 34 are pushed against the at least one second tooth structure 301 of the first cycloid disc set 30 and the at least one fourth tooth structure 311 of the second cycloid disc set 31, the third roller assembly 34 is rotated about the output shaft 340. As mentioned above, the at least one third roller 341 is installed on the output shaft 340. Since the output shaft 340 is rotated with the at least one third roller 341, the output shaft 340 is used as the power output. Consequently, the rotating speed of the output shaft 340 is $((A \times M) - (B \times N))/(A \times M)$ times the rotating speed of the motor 2. That is, a second-stage speed reduction is achieved.

In an embodiment, the number of the first rollers 321 is one less than the number of the at least one first tooth structure 300, the number of the second rollers 331 is one less than the number of the at least one third tooth structure 310, and the number of the third rollers 341 of the third roller assembly 34 is one less than the number of the at least one second tooth structure 301 or the number of the at least one fourth tooth structure 311. That is, the number A of the at least one first tooth structure 300 is equal to $(N+1)$, the number A of the at least one third tooth 310 is equal to (N+1), the number B of the at least one second tooth structure 301 is equal to (M+1), and the number B of the at least one fourth tooth structure 311 is equal to (M+1). Consequently, the rotating speed of the first cycloid disc set 30 (and the second cycloid disc set 31) is 1/(N+1) times the rotating speed of the motor 2. As mentioned above, the output shaft 340 is used as the power output. Consequently, the rotating speed of the output shaft 340 is ((M−N)/((N+1)×M) times the rotating speed of the motor 2.

Figure 4:
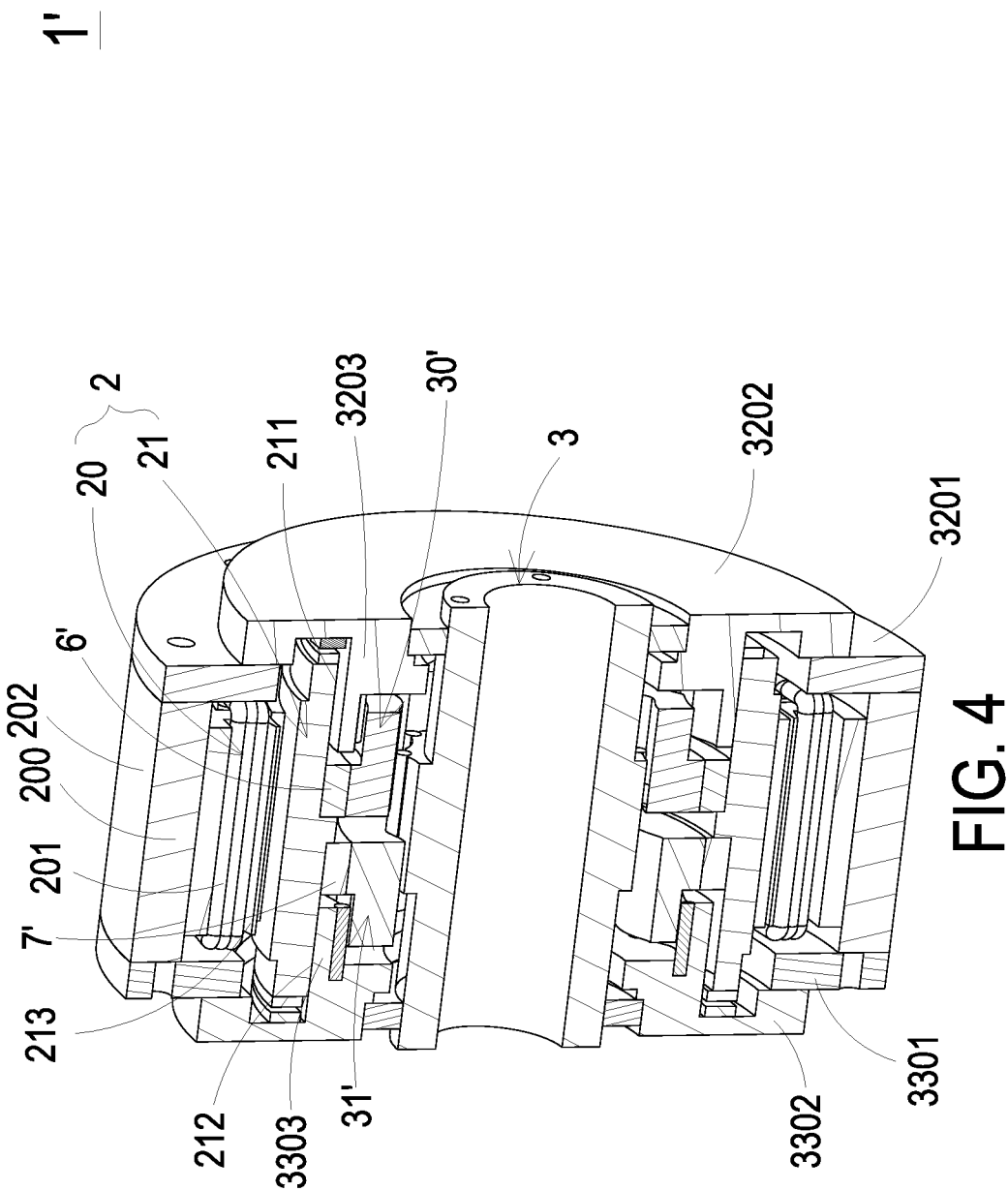
FIG. 4 is a schematic cutaway view illustrating a speed reducing device having a power source according to a second embodiment of the present disclosure.
Figure 5:
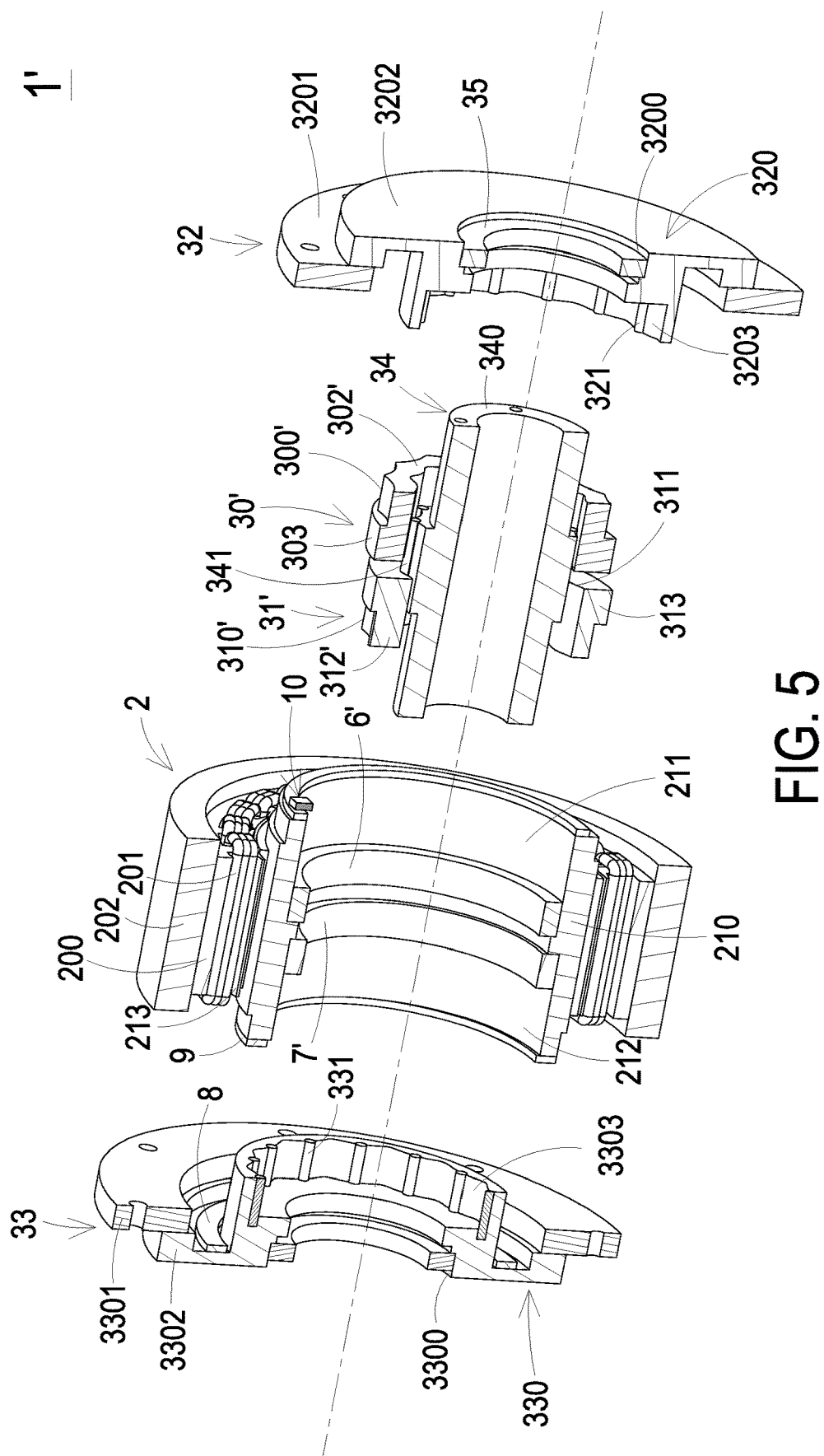
FIG. 5 is a schematic exploded view illustrating the speed reducing device of FIG. 4.
Figure 6:
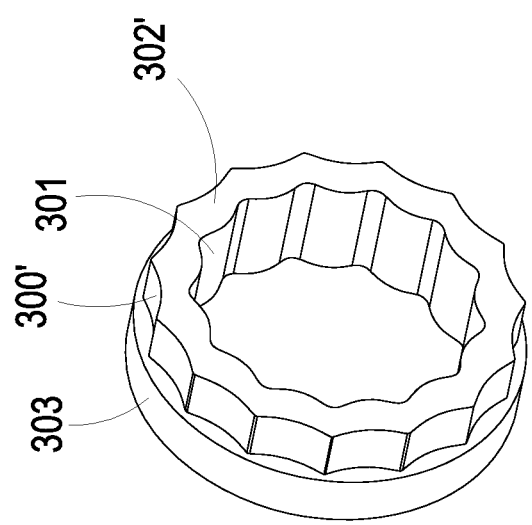
FIG. 6 is a schematic perspective view illustrating a first inner cycloid disc and a first outer cycloid disc of the first cycloid disc set of the speed reducing device of FIG. 4.

Please refer to FIGS. 4, 5 and 6. FIG. 4 is a schematic cutaway view illustrating a speed reducing device having a power source according to a second embodiment of the present disclosure. FIG. 5 is a schematic exploded view illustrating the speed reducing device of FIG. 4. FIG. 6 is a schematic perspective view illustrating a first inner cycloid disc and a first outer cycloid disc of the first cycloid disc set of the speed reducing device of FIG. 4. The structure, operating principle and reduction ratio of the speed reducing device 1' of this embodiment are similar to those of the first embodiment. Component parts and elements corresponding to those of the first embodiment are designated by identical numeral references, and detailed descriptions thereof are omitted.

In comparison with the first embodiment, the following aspects are distinguished. In this embodiment, the first rotor inner bearing set 6' comprises a single bearing, and the second rotor inner bearing set 7' comprises a single bearing. The first rotor inner bearing set 6' is disposed between the first eccentric ring 211 and the first inner cycloid disc 303 of the first cycloid disc set 30'. The second rotor inner bearing set 7' is disposed between the second eccentric ring 212 and the second inner cycloid disc 313 of the second cycloid disc set 31'. In comparison with the first embodiment, the structures of the first cycloid disc set 30' and the second cycloid disc set 31' of this embodiment are also distinguished. The structure of the first cycloid disc set 30' and the structure of the second cycloid disc set 31' are similar. Consequently, only the structure of the first cycloid disc set 30' is shown in FIG. 6. The at least one first tooth structure 300' is protruded from an outer surface of the first outer cycloid disc 302'. The at least one second tooth structure 301 is also protruded from an inner surface of the first inner cycloid disc 303. The at least one third tooth structure 310' is protruded from an outer surface of the second outer cycloid disc 312'. The at least one fourth tooth structure 311 is also protruded from an inner surface of the second inner cycloid disc 313. A portion of the first ring-shaped extension wall 3203 is disposed between the at least one first tooth structure 300' and the first eccentric ring 211. A portion of the second ring-shaped extension wall 3303 is disposed between the at least one third tooth structure 310' and the second eccentric ring 212. The at least one first roller 321 is disposed on an inner surface of the first ring-shaped extension wall 3203. The at least one second roller 331 is disposed on an inner surface of the second ring-shaped extension wall 3303. The at least one first roller 321 is contacted with the at least one corresponding first tooth structure 300'. The at least one second roller 331 is contacted with the at least one corresponding third tooth structure 310'. The at least one third roller 341 is contacted with the at least one corresponding second tooth structure 301 and the at least one corresponding fourth tooth structure 311. In an embodiment, the number of the at least one first tooth structure 300' and the number of the at least one second tooth structure 301 are different, and the number of the at least one third tooth structure 310' and the number of the at least one fourth tooth structure 311 are different. Moreover, the first outer cycloid disc 302' and the first inner cycloid disc 303 are integrally formed with each other (see FIG. 6) or fixedly connected with each other through an assembling process. The second outer cycloid disc 312' and the second inner cycloid disc 313 are integrally formed with each other (see FIG. 6) or fixedly connected with each other through an assembling process.

The principles of achieving the desired reduction ratio by using the speed reducing device 1' will be described as follows. For example, the number of the first rollers 321 of the first roller assembly 32 is N, the number of the second rollers 331 of the second roller assembly 33 is N, and the number of the third rollers 341 of the third roller assembly 34 is M. The number of the at least one first tooth structure 300' is A, the number of the at least one third tooth structure 310' is A, the number of the at least one second tooth structure 301 is B, and the number of the at least one fourth tooth structure 311 is B. While the rotor portion 21 of the motor 2 is rotated, the first eccentric ring 211 and the second eccentric ring 212 installed on the rotor portion 21 are synchronously rotated with the rotor portion 21. As the first eccentric ring 211 and the second eccentric ring 212 are rotated, the at least one first roller 321 of the first roller assembly 32 contacted with the at least one first tooth structure 300' is not rotatable about the output shaft 340, and the at least one second roller 331 of the second roller assembly 33 contacted with the at least one third tooth structure 310' is not rotatable about the output shaft 340. Since the operations of the first cycloid disc set 30' and the second cycloid disc set 31' are restricted by the above conditions, the rotating speed of the first cycloid disc set 30' (and the second cycloid disc set 31') is (A−N)/A times the rotating speed of the motor 2. That is, a first-stage speed reduction is achieved. Moreover, since the at least one third roller 341 of the third roller assembly 34 are pushed against the at least one second tooth structure 301 of the first cycloid disc set 30' and the at least one fourth tooth structure 311 of the second cycloid disc set 31', the third roller assembly 34 is rotated about the output shaft 340. As mentioned above, the at least one third roller 341 is installed on the output shaft 340. Since the output shaft 340 is rotated with the at least one third roller 341, the output shaft 340 is used as the power output. Consequently, the rotating speed of the output shaft 340 is ((A×M)−(B×N))/(A×M) times the rotating speed of the motor 2. That is, a second-stage speed reduction is achieved.

In an embodiment, the number of the first rollers 321 is one less than the number of the at least one first tooth structure 300', the number of the second rollers 331 is one less than the number of the at least one third tooth structure 310', and the number of the third rollers 341 of the third roller assembly 34 is one less than the number of the at least one second tooth structure 301 or the number of the at least one fourth tooth structure 311. That is, the number A of the at least one first tooth structure 300' is equal to (N+1), the number A of the at least one third tooth structure 310' is equal to (N+1), the number B of the at least one second tooth structure 301 is equal to (M+1), and the number B of the at least one fourth tooth structure 311 is equal to (M+1). Consequently, the rotating speed of the first cycloid disc set 30' (and the second cycloid disc set 31') is 1/(N+1) times the rotating speed of the motor 2. As mentioned above, the output shaft 340 of the third roller assembly 34 is used as the power output. Consequently, the rotating speed of the output shaft 340 is (M−N)/((N+1)×M) times the rotating speed of the motor 2.

From the above descriptions, the present disclosure provides a speed reducing device having a power source. The speed reducing device includes a motor and a speed reducing mechanism. The motor and the speed reducing mechanism are combined as an integral structure. The motor is located at the outer side of the speed reducing device. The speed reducing mechanism is located at the inner side of the speed reducing device along the radial direction. While the rotor portion is rotated, the first cycloid disc set is rotated with the first eccentric ring, and the second cycloid disc set is rotated with the second eccentric ring. The first roller assembly and the second roller assembly are not rotatable, but the third roller assembly is rotatable. Consequently, the first cycloid disc set and the second cycloid disc set interact with the first roller assembly, the second roller assembly and the third roller assembly. In such way, the purpose of reducing the speed at two stages can be achieved. Since it is not necessary to use an additional shaft coupling to connect the motor and the speed reducing mechanism, the volume and weight of the speed reducing device are reduced. Due to the two-stage speed reduction, the purpose of achieving the high reduction ratio is achieved. The speed reducing mechanism of the speed reducing device includes the first cycloid disc set and the second cycloid disc set. In comparison with the reducer having a single cycloid disc, the speed reducing device of the present disclosure has high rigidity and is capable of withstanding a higher load. Moreover, the first cycloid disc set and the second cycloid disc set are respectively installed on the first eccentric ring and the second eccentric ring that have opposite eccentric directions. Consequently, the speed reducing device is capable of reaching dynamic balance.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A speed reducing device having a power source, comprising:
    a motor served as the power source and comprising:
        a stator portion; and
        a rotor portion, wherein the rotor portion is driven to rotate by the stator portion, and the rotor portion comprises a rotor casing assembly having a hollow structure, a first eccentric ring and a second eccentric ring, wherein the first eccentric ring and the second eccentric ring are disposed beside each other and disposed on an inner surface of the rotor casing assembly; and
    a speed reducing mechanism, wherein at least a portion of the speed reducing mechanism is located at an inner side of the motor and accommodated within the rotor portion, and the speed reducing mechanism comprises:
        a first roller assembly located at a first side of the speed reducing mechanism, and comprising a first reducer casing and at least one first roller, wherein the at least one first roller is disposed on the first reducer casing;
        a second roller assembly located at a second side of the speed reducing mechanism, and comprising a second reducer casing and at least one second roller, wherein the at least one second roller is disposed on the second reducer casing;
        a third roller assembly disposed between the first roller assembly and the second roller assembly, wherein the third roller assembly is accommodated within the rotor portion, the first roller assembly and the second roller assembly, and the third roller assembly comprises an output shaft and at least one third roller, wherein the at least one third roller is mounted on the output shaft;
        a first cycloid disc set mounted around the output shaft and disposed within the first eccentric ring, and comprising a plurality of first tooth structures and a plurality of second tooth structures; and
        a second cycloid disc set mounted around the output shaft and disposed within the second eccentric ring, and comprising a plurality of third tooth structures and a plurality of fourth tooth structures,
        wherein the first roller is contacted with at least one of the plurality of first tooth structures, the second roller is contacted with at least one of the plurality of third tooth structures, and the third roller is contacted with at least one of the second tooth structures and at least one of the fourth tooth structures.

2. The speed reducing device having the power source according to claim 1, wherein an eccentric direction of the first eccentric ring and an eccentric direction of the second eccentric ring are opposite to each other.

3. The speed reducing device having the power source according to claim 1, wherein the first roller assembly and the second roller assembly are not rotated about the output shaft, wherein while the rotor portion is rotated, the first cycloid disc set is rotated with the first eccentric ring, the second cycloid disc set is rotated with the second eccentric ring, and the at least one third roller of the third roller assembly is pushed against the corresponding second tooth structure and the corresponding fourth tooth structure, so that the third roller assembly is rotated about the output shaft and the output shaft is correspondingly rotated to generate and output power.

4. The speed reducing device having the power source according to claim 1, wherein the first cycloid disc set further comprises a first outer cycloid disc and a first inner cycloid disc that have hollow disc structures, and the second cycloid disc set further comprises a second outer cycloid disc and a second inner cycloid disc that have hollow disc structures, wherein the first outer cycloid disc and the first inner cycloid disc are disposed side by side, the first inner cycloid disc is disposed between the first outer cycloid disc and the second inner cycloid disc, the second outer cycloid disc and the second inner cycloid disc are disposed side by side, the second inner cycloid disc is disposed between the first inner cycloid disc and the second outer cycloid disc.

5. The speed reducing device having the power source according to claim 4, wherein the plurality of first tooth structures are protruded from an inner surface of the first outer cycloid disc, the plurality of second tooth structures are protruded from an inner surface of the first inner cycloid disc, the plurality of third tooth structures are protruded from an inner surface of the second outer cycloid disc, and the plurality of fourth tooth structures are protruded from an inner surface of the second inner cycloid disc.

6. The speed reducing device having the power source according to claim 4, wherein the plurality of first tooth structures are protruded from an outer surface of the first outer cycloid disc, the plurality of second tooth structures are protruded from an inner surface of the first inner cycloid disc, the plurality of third tooth structures are protruded from an outer surface of the second outer cycloid disc, and the plurality of fourth tooth structures are protruded from an inner surface of the second inner cycloid disc.

7. The speed reducing device having the power source according to claim 1, wherein the first reducer casing comprises:
   a first fixing part with a hollow structure, wherein a portion of the first fixing part is assembled with a first lateral edge of the stator portion and contacted with an outer surface of the rotor casing assembly; and
   a first installation part, wherein a portion of the first installation part is fixed on the first fixing part, a first ring-shaped extension wall is protruded from the first installation part and disposed within the hollow structure of the first fixing part, the first ring-shaped extension wall has a hollow structure, the hollow structure of the first ring-shaped extension wall defines a first axial hole, and a first end of the output shaft is inserted into the first axial hole.

8. The speed reducing device having the power source according to claim 7, wherein the second reducer casing comprises:
   a second fixing part with a hollow structure, wherein a portion of the second fixing part is assembled with a second lateral edge of the stator portion and contacted with an outer surface of the rotor casing assembly; and
   a second installation part, wherein a portion of the second installation part is fixed on the second fixing part, a second ring-shaped extension wall is protruded from the second installation part and disposed within the hollow structure of the second fixing part, the second ring-shaped extension wall has a hollow structure, the hollow structure of the second ring-shaped extension wall defines a second axial hole, and a second end of the output shaft is inserted into the second axial hole.

9. The speed reducing device having the power source according to claim 8, wherein a portion of the first ring-shaped extension wall is disposed between the plurality of first tooth structures and the output shaft, and the at least one first roller is disposed on an outer surface of the first ring-shaped extension wall, wherein a portion of the second ring-shaped extension wall is disposed between the plurality of third tooth structures and the output shaft, and the at least one second roller is disposed on an outer surface of the second ring-shaped extension wall.

10. The speed reducing device having the power source according to claim 8, wherein a portion of the first ring-shaped extension wall is disposed between the plurality of first tooth structures and the first eccentric ring, and the at least one first roller is disposed on an inner surface of the first ring-shaped extension wall, wherein a portion of the second ring-shaped extension wall is disposed between the plurality of third tooth structures and the second eccentric ring, and the at least one second roller is disposed on an inner surface of the second ring-shaped extension wall.

11. The speed reducing device having the power source according to claim 1, wherein a tooth profile of the first outer cycloid disc and a tooth profile of the second outer cycloid disc are identical, a tooth profile of the first inner cycloid disc and a tooth profile of the second inner cycloid disc are identical, the number of the plurality of first tooth structures is equal to the number of the plurality of third tooth structures, and the number of the plurality of second tooth structures is equal to the number of the plurality of fourth tooth structures.

12. The speed reducing device having the power source according to claim 1, wherein the number of the at least one first roller is equal to the number of the at least one second roller, the number of the at least one first roller is at least one less than the number of the plurality of first tooth structure, the number of the at least one second roller is at least one less than the number of the plurality of third tooth structures, and the number of the at least one third roller is at least one less than the number of the plurality of second tooth structures or the number of the plurality of fourth tooth structures.

13. The speed reducing device having the power source according to claim 1, wherein the number of the plurality of first tooth structures and the number of the plurality of second tooth structures are different, and the number of the plurality of third tooth structures and the number of the plurality of fourth tooth structures are different.

* * * * *